United States Patent [19]

Yamada

[11] Patent Number: 4,682,286
[45] Date of Patent: Jul. 21, 1987

[54] SYSTEM FOR SUPERVISING PHOTOMECHANICAL PROCESS

[75] Inventor: Mitsuhiko Yamada, Kyoto, Japan

[73] Assignee: Dainippon Screen Mfg. Co., Ltd., Kyoto, Japan

[21] Appl. No.: 674,329

[22] Filed: Nov. 21, 1984

[30] Foreign Application Priority Data

Dec. 30, 1983 [JP] Japan ................. 58-247933

[51] Int. Cl.⁴ ............... G06F 13/12; G06F 13/16
[52] U.S. Cl. ....................... 364/200; 355/77; 358/256; 358/76; 358/80
[58] Field of Search ............. 355/32, 77, 132; 358/75-80, 256; 364/200

[56] References Cited

U.S. PATENT DOCUMENTS

| 4,269,500 | 5/1981 | Ito et al. ............... 355/14 C |
| 4,454,575 | 6/1984 | Bushaw et al. ........ 358/256 X |
| 4,622,631 | 11/1986 | Frank et al. .......... 364/200 |
| 4,626,989 | 12/1986 | Torii ...................... 364/200 |

FOREIGN PATENT DOCUMENTS

| 0077835 | 4/1982 | European Pat. Off. |
| 56-29237 | 3/1981 | Japan |
| 56-94228 | 7/1981 | Japan |
| 58-50540 | 3/1983 | Japan |
| 2073460 | 3/1981 | United Kingdom |
| 2077469 | 6/1981 | United Kingdom |
| 2079997 | 7/1981 | United Kingdom |
| 2128782 | 10/1983 | United Kingdom |

OTHER PUBLICATIONS

"Computergestutzt Retuschieren und Montieren", *Der Polygraph* 19–79, pp. 1585, 1586, 1588 and 1590.

Primary Examiner—L. T. Hix
Assistant Examiner—D. Rutledge
Attorney, Agent, or Firm—Lowe, Price, Leblanc, Becker & Shur

[57] ABSTRACT

Terminals provided for processing devices of a photomechanical process are connected to a common memory via a bus, wherein all the data stored in the common memory can be output to every terminal, and new, renewed or rewritten data are input to the common memory via the corresponding terminal.

9 Claims, 4 Drawing Figures

SYSTEM FOR SUPERVISING PHOTOMECHANICAL PROCESS

FIELD OF THE INVENTION

This invention relates to an apparatus for supervising a photomechanical process to confirm the performance thereof.

BACKGROUND OF THE INVENTION

A photomechanical process is composed of (1) a color separation condition designation process, (2) a color separation film producing process (the processes (1) and (2) are provided for reproducing color images), (3) a proving process, (4) a retouching and inspecting process, (5) a patching up process and (6) a plate producing process, and each of these processes is conventionally performed independently without having close correlations to the others.

However, in company with the development and accompanying expensiveness of recent photomechanical systems as can be seen from the introduction of a layout scanner or a preset device for a color scanner to the systems, a plurality of originals are required to be reproduced at a time onto a plurality of photosensitive materials when the system must be profitable. In other words, when any of the processes, such as the layout process or the proving process delays, the system becomes unprofitable resulting in damaging the enterprise being concerned therewith. To avoid the demerit, each processes must be controlled organically.

SUMMARY OF THE INVENTION

It is an object of this invention to provide a method and system for supervising a photomechanical process resolving the above-mentioned drawbacks.

In order to achieve the above object, a common memory is connected via a data bus to terminals (which are hereinafter defined as data transmitters) such as an original setup terminal, a layout scanner terminal or a proving device terminal provided for each of processing devices in this invention. Thereby, data corresponding to each terminal (including process start and process end data) are input to the common memory, and necessary data is output to each terminal to control the whole photomechanical system. In this, when a terminal is acceptable of automatic data input from the common memory, necessary data are input directly to the terminal. When not, necessary data are once displayed on a display monitor, and then the data are manually input by means of an input device.

By the way, all the data stored in the common memory can be submitted to a reference at every terminal, however, a terminal can manage only data of its own charge, not the other data.

The above and other objects and features of this invention can be appreciated more fully from the following detailed description when read with reference to the accompanying drawings.

PREFERRED EMBODIMENT OF THIS INVENTION

Figure 1:
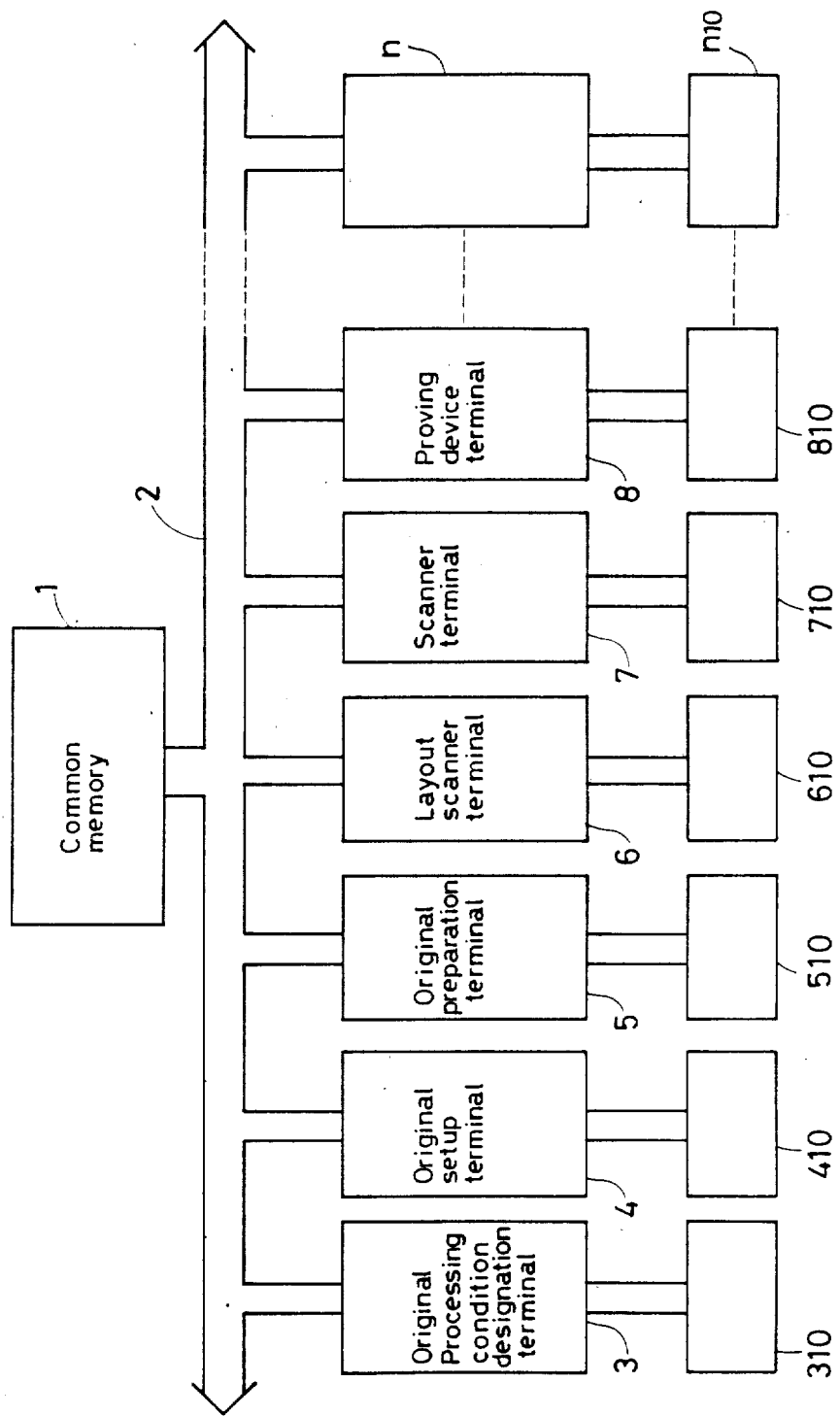
FIG. 1 shows a block chart of the method of this invention.

FIG. 1 shows a block chart of the embodiment of this invention, in which a common memory 1 is connected to terminals (data transmitters) 3 to n provided for processing devices 310 to n10 via a data bus 2.

Figure 2:
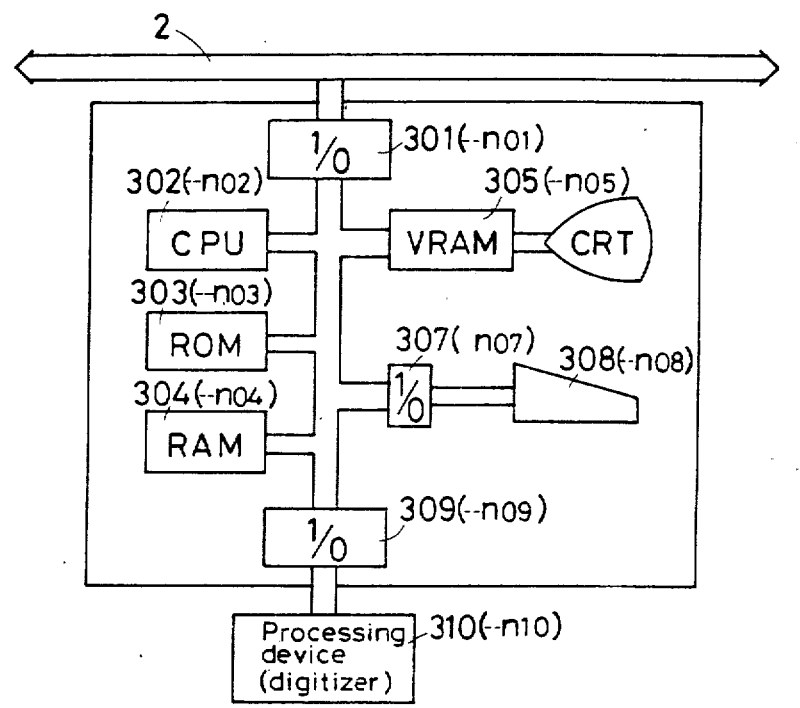
FIG. 2 shows the structure of a terminal.

FIG. 2 shows the detail of the original processing condition designation terminal 3 provided for the device (digitizer) 310 as a representative of all the terminals to explain the structure of the device called a "terminal" (every terminal has the same structure). The terminal 3 comprises an interface (1/0) 301 between the common memory 1 and units 302 to 305 (mentioned below); a CPU 302; a ROM 303 for storing a main program, a monitor program and character data; a RAM 304 for temporarily memorizing numbers produced in a computation process of the CPU 302; a VRAM 305 for the display monitor 306; an interface (1/0) 307 between a keyboard 308 and the units 302 to 305; an interface 309 between a processing device 310 and the units 302 to 305. There are some processing devices which cannot be connected to the interface 309. Incidentally, the ROM 303 and the RAM 304 of each terminal have proper capacities respectively.

Thus constructed terminal operates using the data stored in the common memory 1. In this, all the data stored in the common memory 1 can be output to any terminal, however, the data can be rewritten only in a specified terminal when the rewriting is required (for example, when a scanning process is finished).

An original processing condition designation terminal 3 is provided for an input device 310 such as a digitizer.

In this, data of an operation start and stop dates, processing devices to be used, operation schedule, a layout pattern, scanners to be used for originals, an arrangement of the originals profitable for higher use efficiency of the scanners and so forth are input to the common memory 1 by means of the keyboard 308 and the digitizer 310.

Such data can be determined via both the terminal 3 and the other terminals 4 to n. That depends on cases. When the data are input to the common memory 1 via the terminal 3, for example, Table 1 showing an operation schedule can be obtained.

In Table 1 displayed on an display monitor, originals are numbered in due order, while the scheduled completion date of each process is input to the common memory observing the display. The actual completion date of each operation is not input from the original processing condition designation terminal 3 as mentioned before. To make the Table 1 on the display comprehensible, a completed process, a delayed process, a today's process and a future process can be represented by, for example, marks O, +, △, and □ respectively. When the display is a color display, the processes can be expressed by corresponding colors instead of said marks, or important processes such as a delayed process or an out-of-order process can be expressed by a flasher light or a warning buzzer.

Table 2 shows a color separation condition data (a) of the original processing condition designation terminal 3. In Table 2, there is first given a number to each original according to the due order. Then the name of the original, the user's name, a layout number, a layout name, scheduled operation dates are input to the common memory. An operation device to be used can be determined by either the terminal 3 or the other corresponding terminal. The actual beginning date and the completion date of each operation are input to the common memory via the corresponding terminal automatically from the corresponding processing device or manually from a keyboard.

Table 3 shows another color separation condition data (b) of the original processing condition designation terminal 3. In Table 3, since the name of an original and the user's name are already input to the common memory, they are displayed on the display automatically. Then the other data are successively input by an operator.

Table 4 shows recording position designation data for the operation of a layout scanner. When a layout number is input to the CPU 302, the scheduled data are automatically input from Table 1. The actual operation beginning date and completion date are input from the corresponding terminals. The number of a scanner to be used can be input from the terminal 3 or the layout terminal. Then one of Modes for recording color separation images: (1) separate mode, (2) two-by-two mode and (3) simultaneous mode is selected. Then the original number is input to the CPU 302 and the address (X, Y) of a recording start and a stop points thereof are input to the CPU 302. The address data can also be input from the keyboard 308. According to the address data, the CPU 302 computes the placing address of the originals on an input scanning drum (mentioned afterwards) to complete Table 5. In Table 5, the layout number, the scheduled date of the operation and the original picture numbers are automatically input from Table 4, while the placing address of the originals are the computed resultant of the CPU 302 according to Table 4. These data are input to the common memory 1.

An original setup terminal 4 is connected to an original setup device 410 such as disclosed in Japanese Patent Laid Open Nos. 56-94228 and 58-50540, in which the number or an original is input to a CPU 402, the original is setup, and the color separation condition data are determined. In this, the data of Table 3 which is already input from the terminal 3 can be rewritten.

An original preset terminal 5 is connected to an original present device 510 such as disclosed in Japanese Patent Laid Open No. 56-29237, in which original pictures are successively placed onto a removable input scanning drum for a layout process according to the data of Table 5, and the placing addresses of the originals are corrected. When the placing addresses of the originals are wrong or inefficient, or the originals are not placed on the input scanning drum, a warning sign is displayed.

A layout scanner terminal 6 is connected to a layout scanner 610 such as disclosed in Japanese Patent Laid Open No. 58-168861, in which all the data of a plurality of originals input from a keyboard are once stored into a memory; and when the originals are reproduced, data of each of the originals are output one by one under the control of a CPU.

Figure 3:
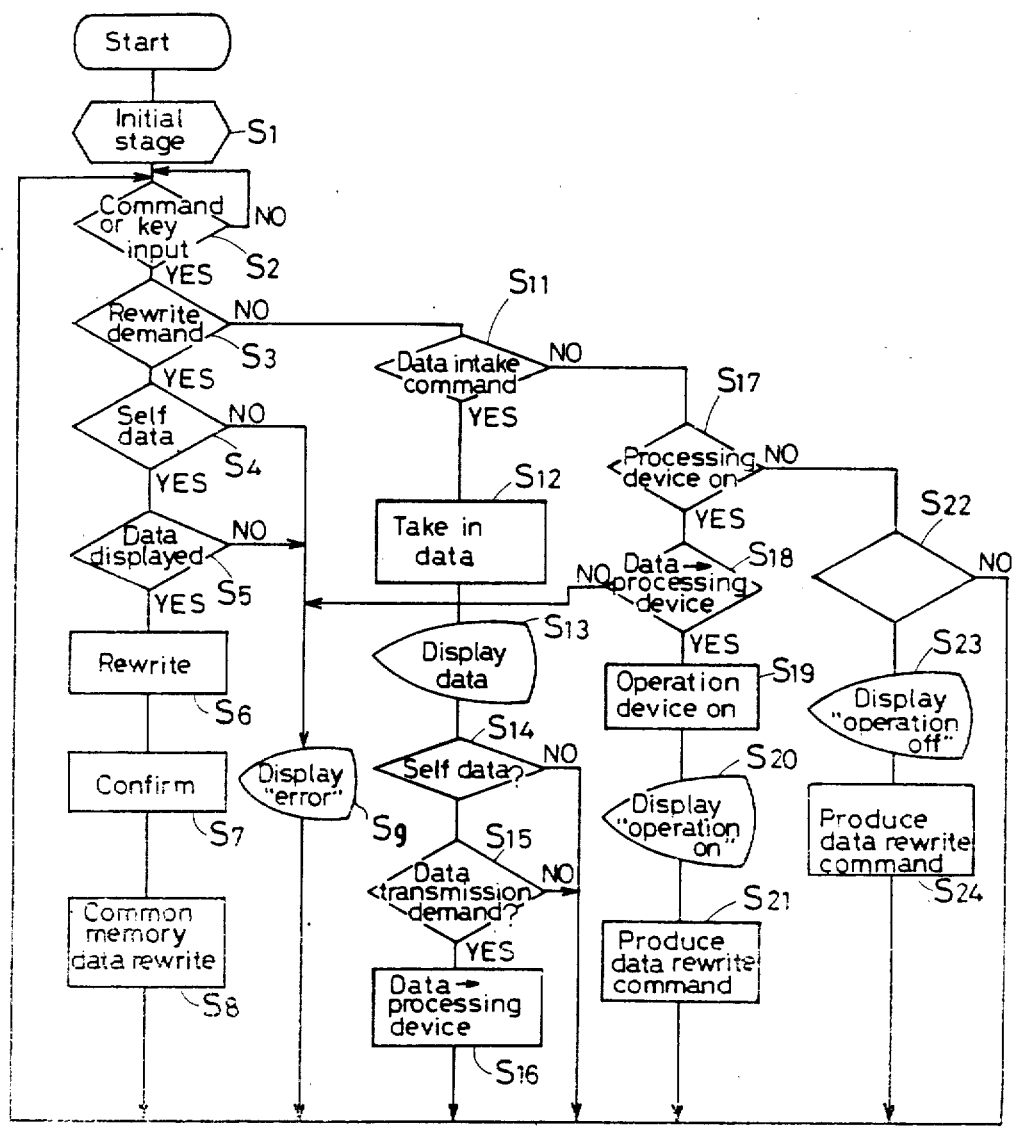
FIG. 3 shows a flow chart of the operation of a terminal.

FIG. 3 shows a flow chart of the operation of the terminal 6. At first the terminal 6 is put into the initial stage ($S_1$). When no command is input from a keyboard 608, the terminal is put into a wait condition ($S_2$: No). When a command for taking necessary data in from the common memory 1 is input from the keyboard 608, the judges of steps $S_2$, $S_3$ and $S_{11}$ become "Yes", "No", "Yes" respectively. Therefore, the terminal 6 takes in the data of Tables 3, 4 and 5 from the common memory 1 via an interface 601 to a RAM 604 ($S_{12}$), and display the data via a VRAM 605 on a CRT display 606 ($S_{13}$). When the data corresponds to the terminal 6, the judge of a step $S_{14}$ becomes "Yes". When the data transmission request signal is input to the CPU 602, the judge of a step $S_{15}$ becomes "Yes", therefore, the data are transmitted via an interface 609 to the scanner 610 ($S_{16}$). Then the operation of the CPU 602 returns to the step $S_2$.

Figure 4:
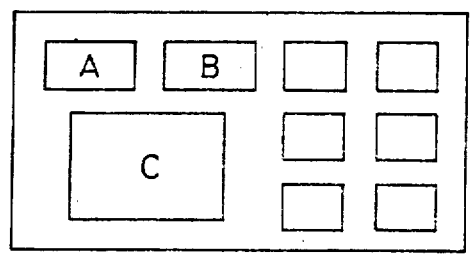
FIG. 4 shows an arrangement of several originals observed in this invention.

Before being transmitted to the scanner 610, the data of FIGS. 3, 4 and 5 can be rewritten as in a way shown in FIG. 3. At first, a data display command is input from the keyboard 608 to display the data of FIGS. 3, 4 and 5. Then the judges of the steps $S_2$, $S_3$ and $S_4$ become "Yes", "No" and "Yes" respectively. The data are transmitted from the common memory 1 to the RAM 604 ($S_{12}$), and then output to the CRT display via a VRAM 605 ($S_{13}$). Since the judges of the steps $S_{14}$ and $S_{15}$ become "Yes" and "No" respectively, the operation of the CPU 602 returns to the step $S_2$. When a rewrite command is input to the CPU 602, the judge of the steps $S_2$, $S_3$, $S_4$ and $S_5$ all become "Yes". Consequently, the data of FIGS. 3, 4 and 5 are rewritten on the display ($S_6$), and after being checked, the rewritten data are input to the common memory 1 ($S_8$).

When data which is desired to be rewritten corresponds to the other operation device, the judge of the step $S_4$ becomes "No", and an error sign is displayed ($S_9$). Of course the data are not rewritten then.

After being rewritten at need, necessary data are transmitted to the scanner 610 as in the above way ($S_{16}$). After the data transmission process, the scanner is put into an operation.

By turning on the start switch of the scanner 610, an operation start command signal is input to the CPU 602 (when the switch is provided in the terminal 6, the operation start command is input from the scanner 610 via the interfaces 607 and 609). Therefore, the judges of the steps $S_2$, $S_3$, $S_{11}$, $S_{17}$ and $S_{18}$ become "Yes", "No", "No", "Yes" and "Yes" respectively, and the scanner 610 begins to operate ($S_{19}$). During the operation time, a working sign and for example the operation beginning date of Table 4 are displayed on a display ($S_{20}$). Then data for designating the start of the operation are input via the interface 601 to the common memory 1 ($S_{21}$) and new data of such as the operation start date are stored into the common memory ($S_2 \rightarrow S_3 \rightarrow S_4 \rightarrow S_5 \rightarrow S_6 \rightarrow S_7 \rightarrow S_8$). When the operation is finished, the operation completion date is written onto Table 4, the actual operation beginning date and completion date is written onto Table 2, and the settled data are written onto Table 1.

The proving terminal 8 can be connected to a processing device 810 such as a proving device or an instrument for measuring of the density of prints as disclosed in Japanese Patent Laid Open No. 58-45527. As mentioned before, when the device 810 is incapable of receiving data directly via the interface 809, the data are once displaced on the display, and an operator input them manually from a keyboard 808.

Although in the above description, there is provided one terminal for one process, a plurality of terminals can be used instead. When a plurality of terminals are used, they are to be of course numbered, and the one actually used out of them are memorized in the common memory (refer to Table 2).

When several data are output from plural terminals to the common memory 1 simultaneously, the data collide each other on the data bus. To resolve the problem, another CPU is provided to put the data in order, or a method of LAN such as CSMA/CD (Carrier Sense Multiple Access with Collision Detection) is of course adopted.

The common memory can be provided with a device for checking the data transmission process at need. The common memory is of course a non-volatile memory such as a floppy disc, a disc or a magnetic bubble memory.

The common memory 1 can also be provided with a CPU 102, a ROM 103, a RAM 104, interfaces 101 and 109, a VRAM 105, a monitor 106, a keyboard 108, an interface 107 for the keyboard like the other processing devices.

As mentioned above, the entire photomechanical process and the devices of this invention can be controlled by storing data such as of original number, operation schedule, operation beginning date or operation complition date into a common memory. Accordingly, the data which are conventionally managed individually are displayed on a display synthetically. Furthermore, data necessary for increasing the efficiency of the processes or the fact which process needs higher efficiency can be seized, which leads to improvement of an equipment efficiency.

In addition, the data transmission, which has conventionally been performed independently in each process, is carried out automatically to the common memory correlating each other in this invention, which results in prevention of mistake and attainment of constant quality of products.

TABLE 1

| | (Centralized process control on CRT display) | | | | | | | | |
|---|---|---|---|---|---|---|---|---|---|
| | Date: | | | | Operation schedule | | | | |
| Process Original No. | a Process | b Process | c Process | d Process | e Process | f Process | g Process | h Process | i Process |
| 1 2 3 4 5 | ○ | ○ | ○ | ○ | ○ | ○ | ○ | Δ | □ | ... |
| 1 2 3 4 6 | ○ | ○ | ○ | ○ | ○ | ○ | ○ | Δ | □ | ... |
| 1 2 3 5 1 | ○ | ○ | ○ | Δ | □ | □ | □ | □ | □ | ... |
| 1 2 3 5 3 | ○ | ○ | ○ | □ | □ | □ | □ | □ | □ | ... |
| 1 2 3 5 4 | ○ | ○ | Δ | □ | □ | □ | □ | □ | □ | ... |
| 1 2 3 5 5 | ○ | ✳ | Δ | □ | □ | □ | □ | □ | □ | ... |

Note:
○: Completed process
✳ : Delayed process
Δ: Today's process
□: Future process

TABLE 2

| (Centralized process control on CRT display) | | | | |
|---|---|---|---|---|
| | Color separation condition data (a) | | | |
| Original No.: | | Original name: | User's name: | |
| Systems name and number | Schedule operation date | Actual process beginning date | Actual process completion date | Condition ΔΟ |
| Original preparation device | | | | |
| Original setup device | | | | |
| scanner | | | | |
| Layout scanner | | | | |
| Retouching device | | | | |
| Drawing processing device | | | | |
| Proving device | | | | |
| | Layout No.: | Layout Name: | | |

TABLE 3

| (Centralized process control on CRT display) | | | | | |
|---|---|---|---|---|---|
| | Color saparation condition data (b) | | | | |
| | Original No.: | Original name: | User's name: | | |
| Color separation condition | H (0.10) | | S (2.45) | | |
| | Color collection Standard I ( ) Standard II ( ) the other | | | | |
| | Y/Y (6.5) | Y/M (5.0) | Y/C (4.5) | Y/O (3.8) | Y/V (4.8) | Y/G (5.3) |
| | M/Y ( ) | M/M ( ) | M/C ( ) | M/O ( ) | M/V ( ) | M/G ( ) |
| | C/Y ( ) | C/M ( ) | C/C ( ) | C/O ( ) | C/V ( ) | C/G ( ) |
| | K/Y ( ) | K/M ( ) | K/C ( ) | K/O ( ) | K/V ( ) | K/G ( ) |
| Tone | Y | H S ( ) | M S ( ) | S S ( ) | |
| | M | H S ( ) | M S ( ) | S S ( ) | |
| | C | H S ( ) | M S ( ) | S S ( ) | |

TABLE 3-continued (Centralized process control on CRT display)

|  | K | H S ( ) | M S ( ) | S S ( ) |
|---|---|---|---|---|
| UCR | Y ( ) | M ( ) | C ( ) |  |
|  | ( ) | ( ) | ( ) |  |
| P.D. | Y H ( ) | S ( ) | M H ( ) | S ( ) |
|  | C H ( ) | S ( ) | K H ( ) | S ( ) |
| Trimming | Start point address |  | $y_{st}$ ( ) | $x_{st}$ ( ) |
|  | Stop point address |  | $y_{sp}$ ( ) | $x_{sp}$ ( ) |
| Magnification ratio | ( ) |  |  |  |
|  | Error message |  |  |  |

TABLE 4

(Centralized process control on CRT display)

Output layout address data
Layout No. (     ) Layout name (     )
User's name (     )

Original processing designation data

| Scheduled date: | Device No. ( ) |
|---|---|
| Completion date: | Device No. ( ) |

Layout processing designation data

| Scheduled date: | Device No. ( ) |
|---|---|
| completion date: | Device No. ( ) |
| Output mode ( )  1. separately | 2. by twos   3. together |
| Output layout data | Start address  Stop address |

| Original No. | Y | X | Y | X |
|---|---|---|---|---|
| ( ) | ( ) | ( ) | ( ) | ( ) |
| ( ) | ( ) | ( ) | ( ) | ( ) |
| . | . | . | . | . |
| . | . | . | . | . |
| . | . | . | . | . |

TABLE 5

(Centralized process control on CRT display)

Table of Original place on input scanning drum
Layout No. (     ) Layout name (     )

Original processing designation data

| Scheduled date: | Device No. ( ) |
|---|---|
| Completion date: | Device No. ( ) |

Original preparation data

| Scheduled date: | Device No. ( ) |
|---|---|
| Completion date: | Device No. ( ) |

Layout scanner data

| Scheduled date: | Device No. ( ) |
|---|---|
| Completion date: | Device No. ( ) |

| Original No. | Place address | Original |
|---|---|---|
| ( ) | ( ) ( ) | A |
| ( ) | ( ) ( ) | B |
| ( ) | ( ) ( ) | C |
| . | . . | . |
| . | . . | . |

Original layout state
(Refer to FIG. 4)

I claim:

1. A method for supervising a photomechanical process comprising the steps of:
    (a) inputting data via a bus into a common memory unequipped with a CPU by means of a terminal attached to operate a device;
    (b) transmitting data when necessary via the bus from the memory by means of the terminal to carry out a stage of the photomechanical process by the device;
    (c) renewing the data to operate the device stored in the memory when operation of the device completes; and
    (d) rewriting as necessary the data stored in the memory to operate the device only by means of the terminal corresponding to the device.

2. A method claimed in claim 1, wherein data transmission as recited in step (b) is carried out according to an on-line data processing method.

3. A method claimed in claim 1, wherein data transmission of step (b) is carried out according to an off-line data processing method.

4. A method claimed in claim 1, wherein steps (a) through (d) apply to plural devices respectively carrying out different processes of the overall photomechanical process and wherein each device is capable of simultaneous operation, the data concerning each of the processing devices are input to the common memory or output therefrom to be renewed or rewritten by means of a display monitor and a keyboard when the data transmission of step (b) is carried out according to the off-line data processing method.

5. A method claimed in claim 1, wherein when the process is delayed or in a wrong order, a warning lamp or a warning sound is generated.

6. Apparatus for supervising a photomechanical process comprising:
    (a) plural processing devices for implementing said process;
    (b) at least one common memory for storing data requisite for controlling all the processing devices;
    (c) plural terminals respectively associated with said devices, each terminal including a means for supplying from the common memory substantially all the data stored therein and a means for inputting data for the corresponding processing device to (1) renew the data or (2) rewrite the data provided for each of the processing devices;
    said apparatus being operable to display all the data stored in the common memory on a display monitor of every terminal.

7. Apparatus claimed in claim 6, wherein the processing devices are on-line.

8. Apparatus claimed in claim 6, wherein the processing devices are off-line.

9. Apparatus claimed in claim 6, wherein the terminal includes a Central Processing unit and a Random Access Memory, and a keyboard.

* * * * *